United States Patent
Li et al.

(10) Patent No.: US 7,852,432 B2
(45) Date of Patent: Dec. 14, 2010

(54) LIQUID CRYSTAL DISPLAY APPARATUS AND IMAGE CONTROL METHOD THEREOF

(75) Inventors: Wang-Yang Li, Tainan County (TW); Ming-Chia Shih, Tainan County (TW)

(73) Assignee: Chi Mei Optoelectronics Corp., Tainan County (TW)

( * ) Notice: Subject to any disclaimer, the term of this patent is extended or adjusted under 35 U.S.C. 154(b) by 242 days.

(21) Appl. No.: 12/023,502

(22) Filed: Jan. 31, 2008

(65) Prior Publication Data

US 2008/0284947 A1 Nov. 20, 2008

(30) Foreign Application Priority Data

Feb. 27, 2007 (TW) .............................. 96106840 A

(51) Int. Cl.
*G02F 1/13357* (2006.01)

(52) U.S. Cl. .............................. 349/61; 349/68; 345/102

(58) Field of Classification Search ........................ None
See application file for complete search history.

(56) References Cited

U.S. PATENT DOCUMENTS

| | | | |
|---|---|---|---|
| 2005/0184952 A1* | 8/2005 | Konno et al. ................ | 345/102 |
| 2005/0231459 A1* | 10/2005 | Furukawa .................... | 345/102 |
| 2005/0248524 A1* | 11/2005 | Feng et al. .................. | 345/102 |
| 2006/0007111 A1* | 1/2006 | Moon et al. .................. | 345/102 |
| 2006/0214904 A1* | 9/2006 | Kimura et al. ............... | 345/102 |
| 2006/0221044 A1* | 10/2006 | Negley et al. ................ | 345/102 |
| 2007/0152953 A1* | 7/2007 | Hong et al. .................. | 345/102 |
| 2007/0297172 A1* | 12/2007 | Furukawa et al. ........... | 362/231 |
| 2008/0036398 A1* | 2/2008 | Zommer et al. ............. | 315/307 |
| 2008/0198112 A1* | 8/2008 | Roberts ....................... | 345/88 |
| 2009/0267879 A1* | 10/2009 | Masuda ....................... | 345/88 |

FOREIGN PATENT DOCUMENTS

| | | | |
|---|---|---|---|
| JP | 2001-142409 A | * | 5/2001 |
| JP | 2002-99250 A | * | 4/2002 |

* cited by examiner

*Primary Examiner*—Mike Stahl
(74) *Attorney, Agent, or Firm*—Lowe Hauptman Ham & Berner, LLP

(57) ABSTRACT

A liquid crystal display (LCD) apparatus includes a backlight module and a LCD module. The backlight module has a plurality of individually drivable backlight regions. The LCD module has a plurality of display blocks, each of which corresponds to one of the backlight regions and is disposed on an optical path of light emitted from the corresponding backlight regions. A power regulating module is electrically connected to the backlight module and the LCD module for receiving image frame data and controlling light-emitting intensities of the backlight regions in accordance with the image frame data to be displayed by the corresponding display blocks. Each backlight regions has multiple light-emitting units for emitting light in different colors. Each display block has a plurality of pixels, and each of the pixels has multiple filter units. A transmitted spectrum of each of the light-emitting units of the backlight regions corresponds to transmitted spectrums of at least two filter units of each of the pixels in the respective display blocks.

19 Claims, 7 Drawing Sheets

LIQUID CRYSTAL DISPLAY APPARATUS AND IMAGE CONTROL METHOD THEREOF

This application claims the benefit of Taiwan application Serial No. 96106840, filed Feb. 27, 2007, the entirety of which is incorporated herein by reference.

This application is also related to Taiwan application Serial 95110050, filed Mar. 24, 2006, which corresponds to U.S. application Ser. No. 11/688,634, filed Mar. 20, 2007 and the entirety of which is incorporated herein by reference.

BACKGROUND

1. Technical Field

The disclosure relates to a display apparatus and a control method thereof, and, in particular, to a liquid crystal display (LCD) apparatus and an image control method thereof.

2. Related Art

Liquid crystal display (LCD) apparatuses have the advantages of low power consumption, low generated heat, lighted weight and non-radiative property, so that the LCDs have been used in various electronic products and gradually replaced the conventional cathode ray tube (CRT) display apparatus.

However, because the LCD apparatus has a multi-layer structure, the light outputted from the backlight module must penetrate through many optical films and a liquid crystal layer, so that the problem of the optical loss is very serious. Usually, the light finally outputted from the surface of the liquid crystal panel is only equal to a small fraction of the light outputted from the backlight source. Therefore, the LCD apparatus usually has the problem of insufficient brightness.

Regarding to this problem, a conventional solution is to add a white-light filter unit to the tricolor (RGB) filter unit in each pixel so that the light output amount of the white backlight is increased and the pixel brightness is increased. FIG. 1 is a schematic illustration showing the comparison of characteristics according to the conventional method (solid line) and conventional improvement method (broken line), wherein each characteristic represents a relationship between the brightness and the color saturation. As shown in FIG. 1, the brightness of the pixel utilizing the conventional improvement method is significantly increased when the pixel displays the tricolor mixture. However, when the displayed light of the pixel is close to monochromatic light (i.e. red, green or blue light), the brightness of the pixel utilizing the conventional improvement method is inversely lower than that utilizing the conventional method.

This is because the white backlight emitted from the white-light filter unit cannot become the gain for the displayed light when the displayed light approximates to monochromatic light. Inversely, the output amount of the monochromatic light is decreased because the area of the monochromatic filter unit is reduced. Thus, when the monochromatic light is being displayed, the brightness of the pixel utilizing the conventional improvement method is inversely lower than that utilizing the conventional method. Consequently, the brightness variation of the pixel utilizing the conventional improvement method is much greater than that utilizing the conventional method.

Therefore, it is important to provide a LCD apparatus with the enhanced display brightness and stable brightness variation, and an image control method thereof.

SUMMARY

In an embodiment, the invention provides a liquid crystal display (LCD) apparatus including a backlight module, an LCD module, and a power regulating module. The backlight module has a plurality of individually drivable backlight regions. The LCD module has a plurality of display blocks. Each of the display blocks corresponds to one of the backlight regions and is disposed on an optical path of light emitted from the corresponding backlight regions. The power regulating module is electrically connected to the backlight module and the LCD module for receiving image frame data and controlling light-emitting intensities of the backlight regions in accordance with the image frame data to be displayed by the corresponding display blocks. Each backlight regions has multiple light-emitting units for emitting light in different colors. Each display block has a plurality of pixels, and each of the pixels has multiple filter units. A transmitted spectrum of each of the light-emitting units of the backlight regions corresponds to transmitted spectrums of at least two filter units of each of the pixels in the respective display blocks.

In a further embodiment, the invention also provides an image control method of a liquid crystal display (LCD) apparatus including a backlight module and a LCD module. The backlight module has a plurality of individually drivable backlight regions. The LCD module has a plurality of display blocks. Each of the display blocks corresponds to one of the backlight regions and is disposed on an optical path of light emitted from the corresponding backlight regions. Each backlight regions has multiple light-emitting units for emitting light in different colors. Each display block has a plurality of pixels, and each of the pixels has multiple filter units. A transmitted spectrum of each of the light-emitting units of the backlight regions corresponds to transmitted spectrums of at least two filter units of each of the pixels in the respective display blocks. The image control method includes receiving image frame data to be displayed by the display blocks; controlling light-emitting intensities of the backlight regions in accordance with the image frame data; and allowing light emitted from each of the light-emitting units of the backlight regions to pass through said at least two filter units of each of the pixels in the respective display blocks.

Additional aspects and advantages of the disclosed embodiments are set forth in part in the description which follows, and in part are apparent from the description, or may be learned by practice of the disclosed embodiments. The aspects and advantages of the disclosed embodiments may also be realized and attained by means of the instrumentalities and combinations particularly pointed out in the appended claims.

BRIEF DESCRIPTION OF THE DRAWINGS

The embodiments of the invention will become more fully understood from the detailed description and accompanying drawings, which are given for illustration only, and thus are not limitative of the present invention, and wherein.

DETAILED DESCRIPTION OF EMBODIMENTS

The embodiments of the present invention will be apparent from the following detailed description, with reference to the accompanying drawings, wherein the same references relate to the same elements.

Figure 2:
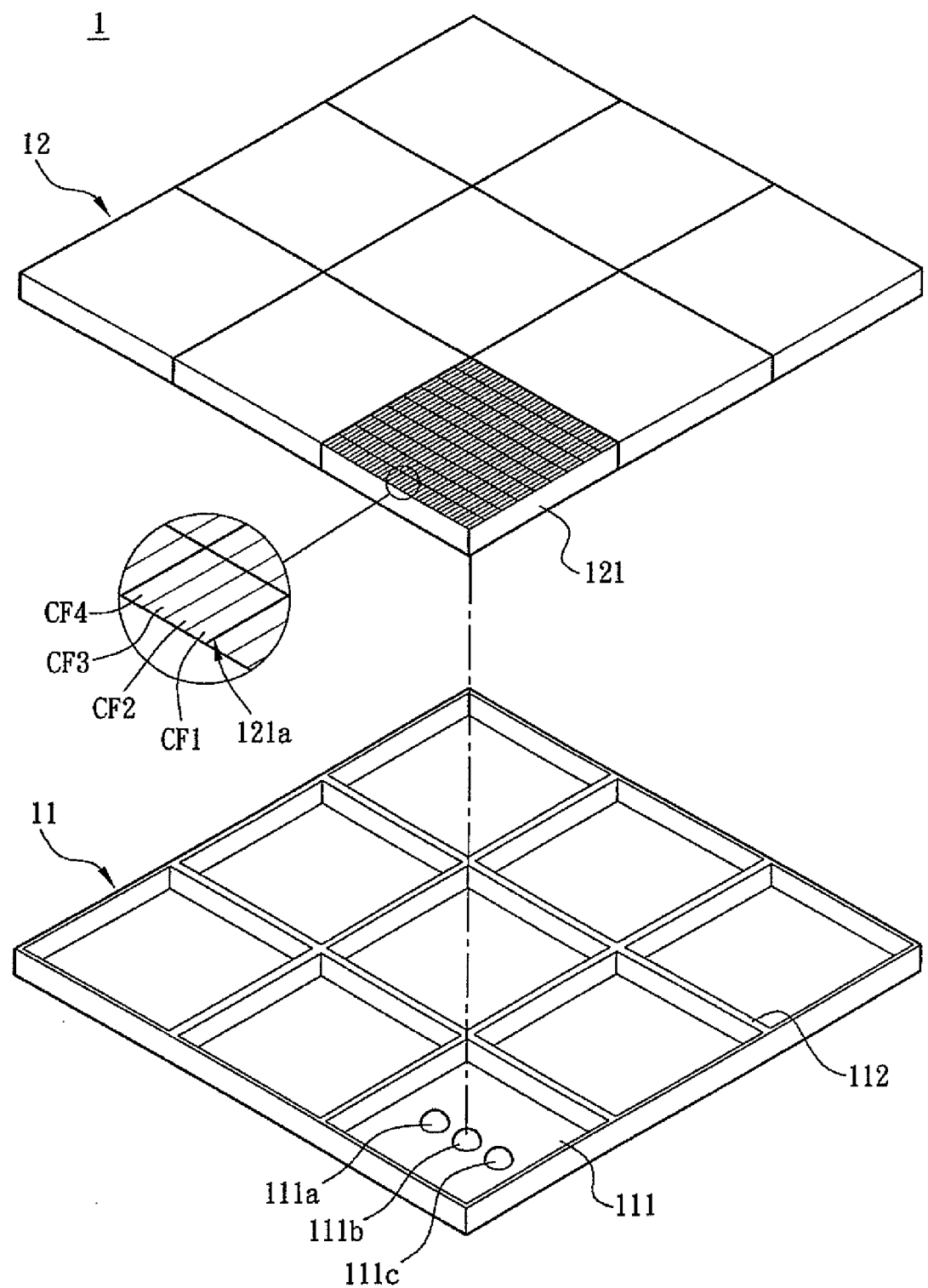
FIG. 2 is schematic illustration showing a LCD apparatus according to an embodiment of the invention.

Referring to FIG. 2, a liquid crystal display (LCD) apparatus 1 according to an embodiment of the invention includes a backlight module 11 and an LCD module 12.

Figure 3A:
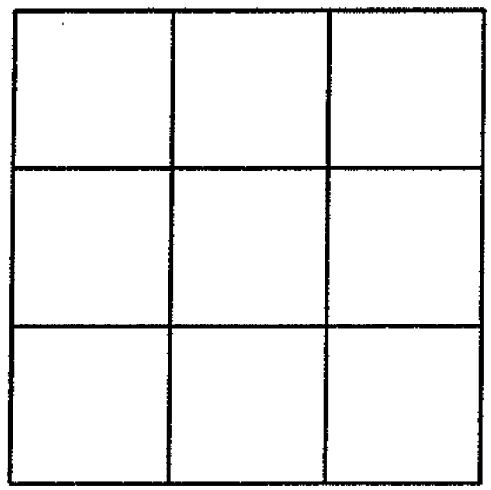
FIGS. 3A and 3B are schematic illustrations showing dividing aspects of the backlight regions of the LCD apparatus according to various embodiments of the invention.
Figure 3B:
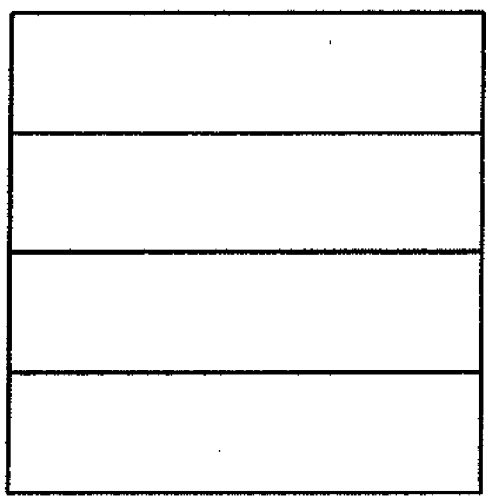

FIGS. 3A and 3B are schematic illustrations showing possible, exemplary dividing manners of backlight regions 111 of the backlight module 11. The backlight module 11 is divided into nine regions in FIG. 3A, while the backlight module 11 is divided into four regions in FIG. 3B. However, the dividing manners of the backlight module 11 are not limited thereto and may be configured according to the preferential consideration of increasing the displayed brightness.

As shown in FIG. 2, a first light-emitting unit 111*a*, a second light-emitting unit 111*b* and a third light-emitting unit 111*c* emitting light of different colors are further disposed in each backlight region 111. In this embodiment, the first light-emitting unit 111*a*, the second light-emitting unit 111*b* and the third light-emitting unit 111*c* are respectively a red light-emitting diode (LED), a green LED and a blue LED.

In order to prevent the light outputted from the backlight regions 111 from interfering with one another, an isolating partition 112 for isolating the backlight outputted from the backlight regions 111 is further disposed between the adjacent backlight regions 111. In practice, the isolating partition 112 may be made of various materials according to the preferential consideration of the good light isolating effect.

As shown in FIG. 2, the LCD module 12 is disposed adjacent to the backlight module 11 and has a plurality of display blocks 121. Each display block 121 corresponds to one backlight region 111 and is disposed on optical paths of the red LED 111*a*, the green LED 111*b* and the blue LED 111*c*. The display block 121 also has a plurality of pixels 121*a*, and each pixel 121*a* has a first filter unit CF1, a second filter unit CF2, a third filter unit CF3 and an enhancing filter unit CF4. The first filter unit CF1 is a red filter unit, so that only red light outputted from the red LED 111*a* can penetrate through the first filter unit CF1. The second filter unit CF2 and the third filter unit CF3 are respectively a green filter unit and a blue filter unit. Similarly, only green light outputted from the green LED 111*b* can penetrate through the green filter unit CF2, and only blue light outputted from the blue LED 111*c* can penetrate through the blue filter unit CF3. In addition, the enhancing filter unit CF4 is a white-light filter unit, and the red light, green light and blue light can penetrate through the enhancing filter unit CF4.

Figure 4A:
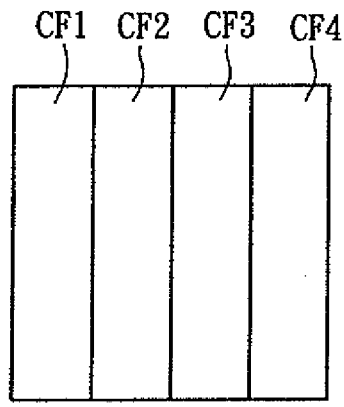
FIGS. 4A to 4C are schematic illustrations showing arrangements of the filter units in the LCD apparatus according to various embodiments of the invention.
Figure 4B:
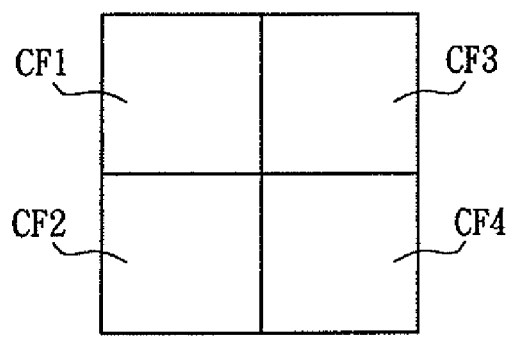
Figure 4C:
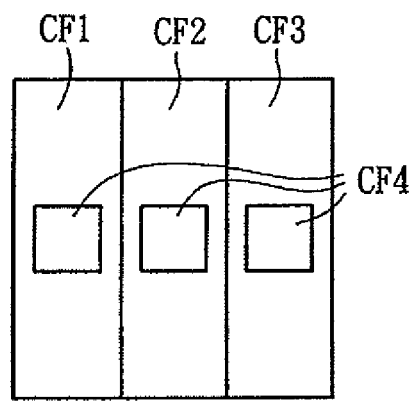

In addition, various arrangements of the filter units are depicted in FIGS. 4A to 4C. FIG. 4A shows a filter composed of four rectangular filter units (CF1 to CF4) having the same area. FIG. 4B shows a filter composed of four square filter units (CF1 to CF4) having the same area. In FIG. 4C, the rectangular filter units (CF1 to CF3), which are, respectively, red, green and blue filter units and have the same area, are disposed in a row, and three square white-light filter units CF4 are respectively disposed at middle portions of the rectangular filter units (CF1 to CF3). To be noted, the arrangements of the filter units are not limited to this embodiment, and may be modified according to the preferential consideration of increasing the displayed brightness.

Figure 5:
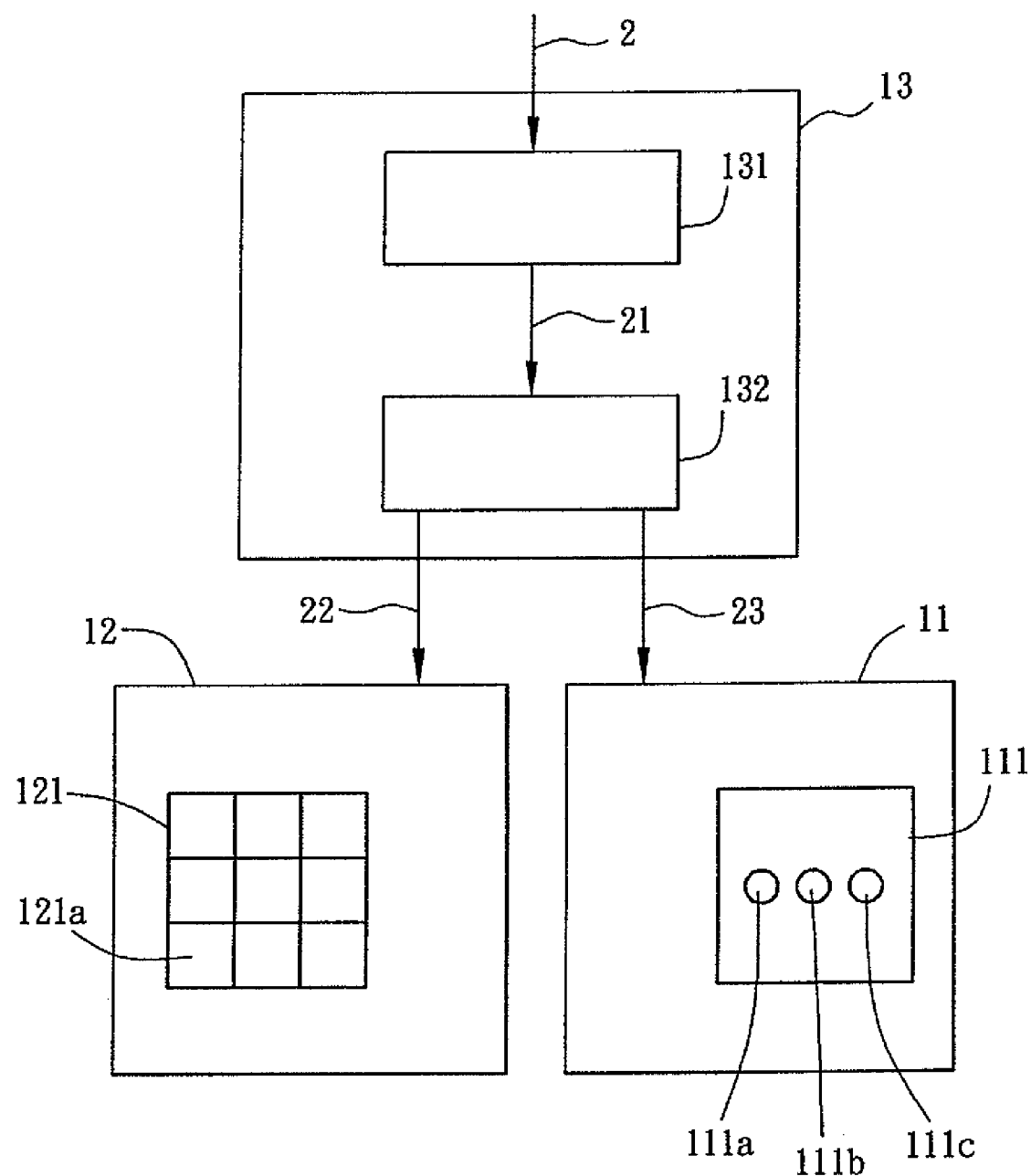
FIG. 5 is a schematic block diagram showing the LCD apparatus according to an embodiment of the invention.

As shown in FIG. 5, the LCD apparatus 1 may further include a power regulating module 13 electrically connected to the backlight module 11 and the LCD module 12. The power regulating module 13 has a dividing unit 131 and a regulating unit 132 electrically connected to the dividing unit 131.

When one image frame data 2 is inputted to the power regulating module 13, the dividing unit 131 divides the image frame data 2 into plural image frame data blocks 21 respectively corresponding to the backlight regions 111. The regulating unit 132 receives at least one image frame data block 21, finds the pixel with the largest transmission rate 22 (e.g., 100 on the 0-255 grey scale) in the image frame data block 21, and adjusts the largest transmission rate 22 to the maximum value (e.g., 255). Therefore, a ratio (255/100) can be obtained. Next, the transmission rates 22 of the other pixels are adjusted, i.e., raised, according to the ratio, and a backlight voltage signal 23 of each of the light-emitting units (111*a* to 111*c*) of the backlight region 111 is also adjusted, i.e., reduced, according to the ratio. Then, the power regulating module 13 outputs the adjusted transmission rates 22 to the respective pixels 121*a* of the display block 121, and outputs the adjusted backlight voltage signals 23 to drive the light-emitting units (111*a* to 111*c*) of the respective backlight region 111 to emit light.

Figure 1:
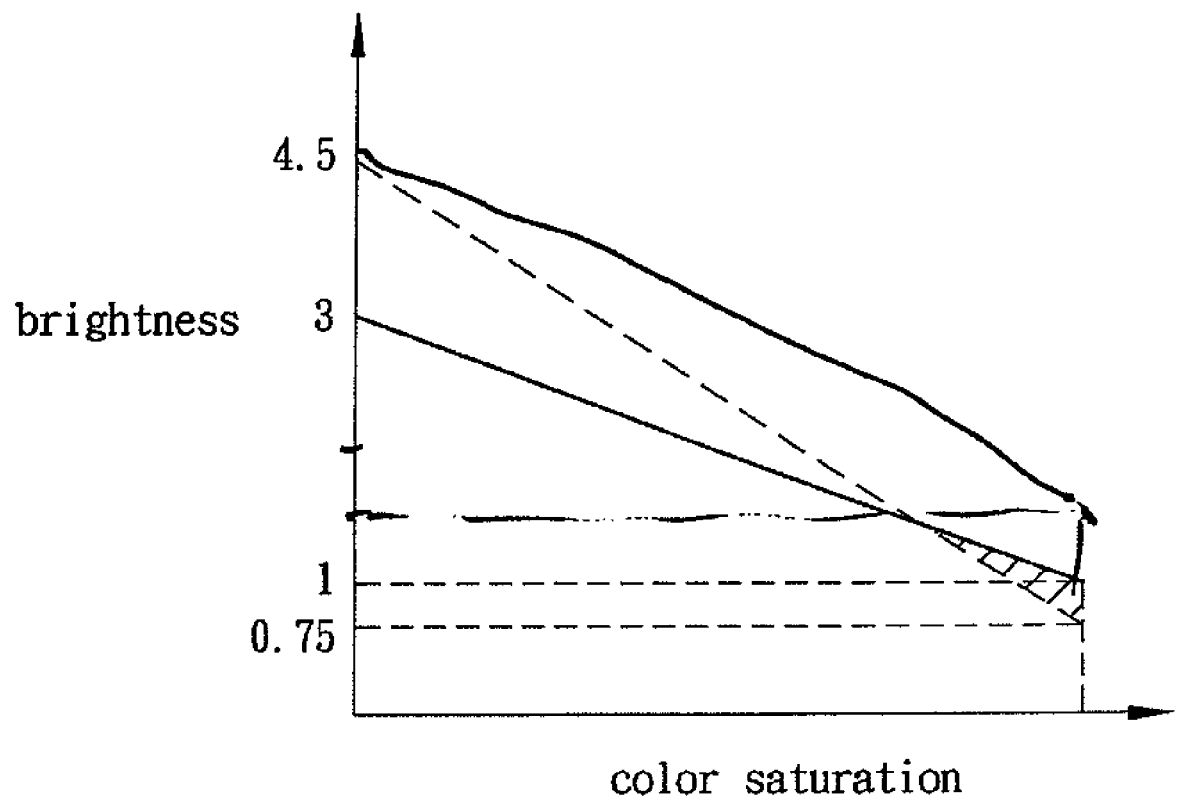
FIG. 1 is a schematic illustration showing the comparison of characteristics according to the conventional method and conventional improvement method, wherein each characteristic represents a relationship between the brightness and the color saturation.
Figure 6:
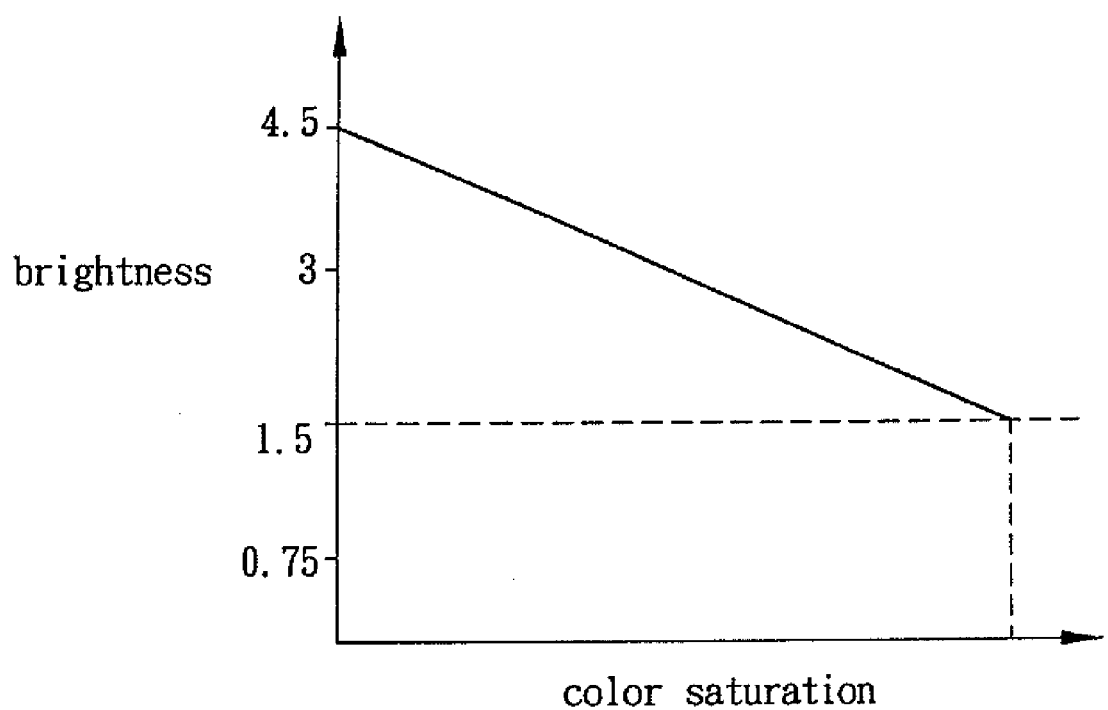
FIG. 6 is a schematic illustration showing a characteristic, which represents a relationship between the brightness and the color saturation of the LCD apparatus according to embodiments of the invention.

FIG. 6 is a schematic illustration showing a characteristic, which represents a relationship between the brightness and the color saturation of the LCD apparatus according to the above disclosed embodiment of the invention. Compared with the characteristics of FIG. 1, the brightness of embodiments of the invention has been improved in many aspects, and the brightness variation of embodiments of the invention is much more stable than that of the conventional improvement method.

Figure 7:
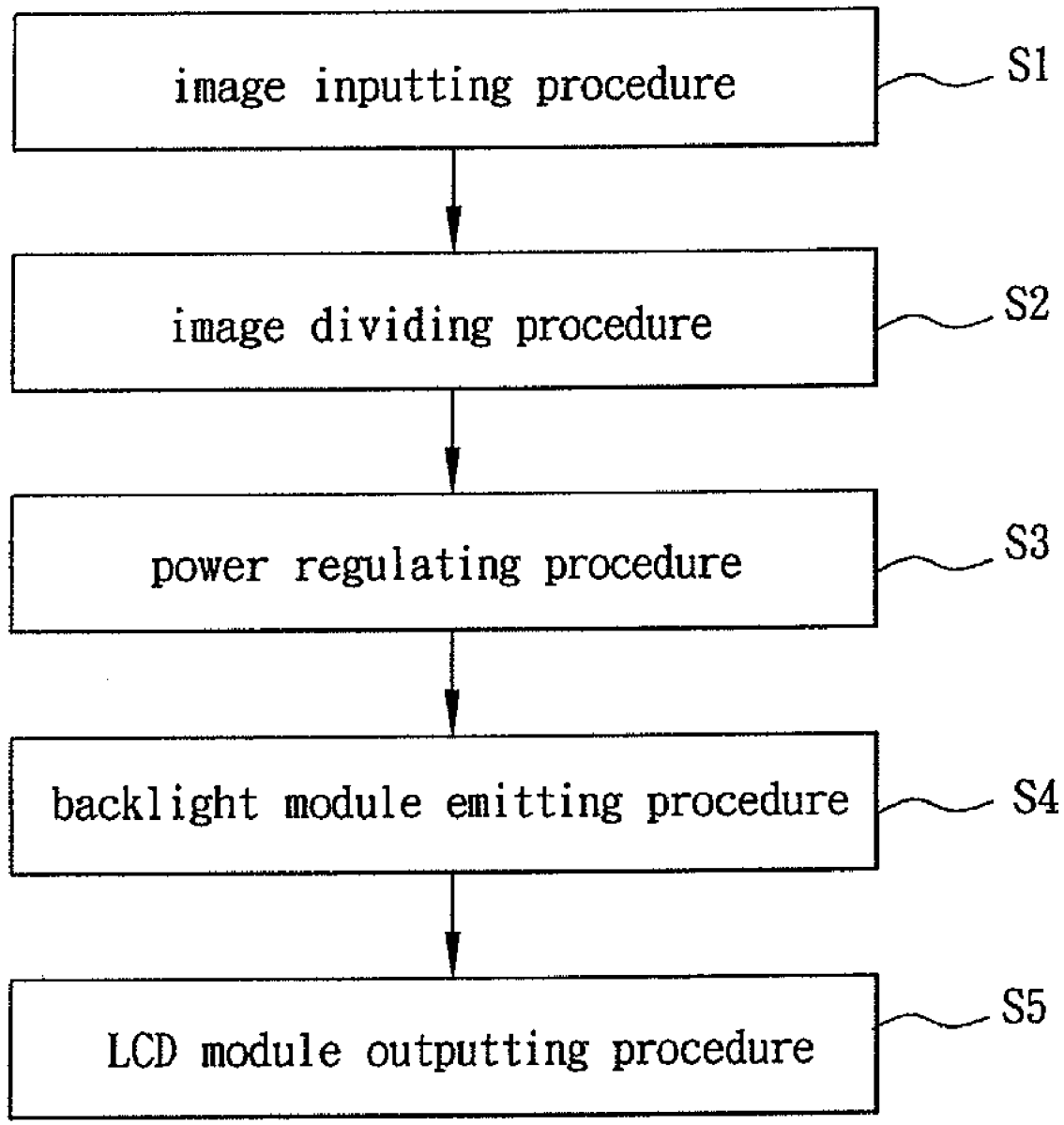
FIG. 7 is a flow chart showing an image control method of the LCD apparatus according to a further embodiment of the invention.

In addition, an image control method according to embodiments of the invention is applied to the LCD apparatuses of FIGS. 2 to 5. As shown in FIG. 7, the image control method includes the following procedures S1 to S5.

The procedure S1 is an image inputting procedure, in which the LCD apparatus 1 sequentially receives image frame data 2.

The procedure S2 is an image dividing procedure, in which the dividing unit 131 of the power regulating module 13 receives the image frame data 2, and divides the image frame data 2 into plural image frame data blocks 21 each according to one of the backlight regions 111.

The procedure S3 is a power regulating procedure, in which the regulating unit 132 raises a transmission rate of each pixel 121*a* in the display block 121 of the LCD module 12 according to a ratio, and reduces an average brightness of each backlight region 111 of the backlight module 11 according to the ratio. It is also within the scope of the present invention to reduces a transmission rate of each pixel 121*a* in the display block 121 of the LCD module 12 according to a ratio, and raises an average brightness of each backlight region 111 of the backlight module 11 according to the ratio.

The procedure S4 is a backlight module emitting procedure, in which the first light-emitting unit 111*a*, the second light-emitting unit 111*b* and the third light-emitting unit 111*c* respectively emit first spectrum light, second spectrum light and third spectrum light according to the reduced average brightness at procedure S3.

The procedure S5 is a LCD module outputting procedure, in which the first spectrum light penetrates through the first filter unit CF1 and the enhancing filter unit CF4 of each pixel 121a, the second spectrum light penetrates through the second filter unit CF2 and the enhancing filter unit CF4 of each pixel 121a, and the third spectrum light penetrates through the third filter unit CF3 and the enhancing filter unit CF4 of each pixel 121a to create an image in conjunction with the LCD module 12 which is being driven according to the raised transmission rate.

The image control method and the functions of each module have been mentioned in the above embodiment, so detailed descriptions thereof will be omitted.

According to another embodiment of the invention, the white-light filter unit of the above-mentioned embodiment is replaced with a cyan filter unit, a magenta filter unit or a yellow filter unit. If the white-light filter unit is replaced with the yellow filter unit, the red light outputted from the red LED in the backlight region penetrates through the red filter unit and the yellow filter unit, and the green light outputted from the green LED in the backlight region penetrates through the green filter unit and the yellow filter unit. Accordingly, the transmissive areas of the red light and the green light are larger in this embodiment so that better brightness may be obtained. Similarly, the magenta filter unit may be selected to enhance the brightness of the red light and the blue light, and the cyan filter unit may be selected to enhance the brightness of the blue light and the green light.

According to still another embodiment of the invention, the red filter unit, the green filter unit and the blue filter unit according to the above-mentioned embodiment are respectively replaced with a cyan filter unit, a magenta filter unit and a yellow filter unit, and the white-light filter unit is removed. In this embodiment, the red light outputted from the red LED in the backlight region penetrates through the magenta filter unit and the yellow filter unit, and the green light outputted from the green LED penetrates through the cyan filter unit and the yellow filter unit, and the blue light outputted from the blue LED penetrates through the cyan filter unit and the magenta filter unit. Compared with the above-mentioned embodiment, this embodiment may obtain the desired brightness with fewer filter units.

According to yet still another embodiment of the invention, the red filter unit, the green filter unit and the blue filter unit according to the above-mentioned embodiment are respectively replaced with a cyan filter unit, a magenta filter unit and a yellow filter unit, while the white-light filter unit is kept. In this embodiment, the red light outputted from the red LED in the backlight region penetrates through the magenta filter unit, the yellow filter unit and the white-light filter unit, the green light outputted from the green LED penetrates through the cyan filter unit, the yellow filter unit and the white-light filter unit, and the blue light outputted from the blue LED penetrates through the cyan filter unit, the magenta filter unit and the white-light filter unit. Compared with the above-mentioned embodiment, this embodiment has larger transmissive areas for each color so that higher brightness may be obtained.

In addition to the above-mentioned modifications, the functions of the modules and the image control methods are the same as those of the above-mentioned embodiment. So, detailed descriptions thereof are omitted.

In summary, the backlight module is divided into different backlight regions so that the outputted backlight becomes more uniform in the LCD apparatus and the image control method thereof according to embodiments of the invention. In addition, the backlight sources with three colors (i.e. red, green and blue) in each backlight region are respectively controlled in accordance with image data. Thus, when one backlight region only needs one monochromatic light, such as red, green or blue light, only the monochromatic light source has to be turned on. Meanwhile, each pixel in the backlight region further has an enhancing filter unit, and the monochromatic light penetrates through both the corresponding color filter unit and the enhancing filter unit. Thus, the light emitted from the enhancing filter unit becomes the gain of the displayed brightness of the monochromatic light.

Compared with the related art, embodiments of the invention add the enhancing filter unit and modifies the structure and arrangement of the backlight module. Thus, embodiments of the invention can enhance the displayed brightness more effectively so that the brightness variation becomes more stable. In addition, a power regulating module is utilized to enhance the transmission rate of each pixel and to decrease the light-emitting intensity of the respective backlight module. Thus, the power consumption of the backlight module can be reduced without decreasing the displayed brightness.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A liquid crystal display (LCD) apparatus, comprising:
   a backlight module having a plurality of individually drivable backlight regions,
   a LCD module having a plurality of display blocks, wherein each of the display blocks corresponds to one of the backlight regions and is disposed on an optical path of light emitted from the corresponding backlight regions, and
   a power regulating module electrically connected to the backlight module and the LCD module, for receiving image frame data and controlling light-emitting intensities of the backlight regions in accordance with the image frame data to be displayed by the corresponding display blocks, the power regulating module comprising:
   a dividing unit for dividing the image frame data into plural image frame data blocks each according to one of the backlight regions and the respective display block; and
   a regulating unit electrically connected to the dividing unit, for adjusting a transmission rate of each of the pixels of each display block and the light-emitting intensity of the respective backlight region according to a ratio derived from the corresponding image frame data block;
   wherein
   each of the backlight regions has multiple light-emitting units for emitting light in different colors;
   each display block has a plurality of pixels, each of the pixels has multiple filter units; and
   a transmitted spectrum of each of the light-emitting units of the backlight regions corresponds to transmitted spectrums of at least two filter units of each of the pixels in the respective display blocks.

2. The LCD apparatus according to claim 1, wherein each of the backlight regions has a first light-emitting unit and a second light-emitting unit for emitting light in different colors;

each of the pixels has a first filter unit, a second filter unit and an enhancing filter unit, a transmitted spectrum of the first filter unit corresponds to a light emitting spectrum of the first light-emitting unit, a transmitted spectrum of the second filter unit corresponds to a light emitting spectrum of the second light-emitting unit, and a transmitted spectrum of the enhancing filter unit corresponds to the light emitting spectrums of the first light-emitting unit and the second light-emitting unit.

3. The LCD apparatus according to claim 2, wherein each of the backlight regions of the backlight module further has a third light-emitting unit having a color different from that of each of the first light-emitting unit and the second light-emitting unit.

4. The LCD apparatus according to claim 3, wherein each of the pixels of the display block further has a third filter unit, a transmitted spectrum of the third filter unit corresponds to a light emitting spectrum of the third light-emitting unit, the transmitted spectrum of the enhancing filter unit corresponds to at least two of the light emitting spectrums of the first light-emitting unit, the second light-emitting unit and the third light-emitting unit.

5. The LCD apparatus according to claim 1, wherein the ratio is equal to a ratio of the highest pixel transmission rate in said image frame data block to a maximum pixel transmission rate.

6. The LCD apparatus according to claim 5, wherein the regulating unit is operable for raising the transmission rate of each of the pixels of the display block and reducing the light-emitting intensity of the respective backlight region according to said ratio.

7. An image control method of a liquid crystal display (LCD) apparatus, the LCD apparatus comprising a backlight module, a LCD module and a power regulating module, wherein the backlight module has a plurality of individually drivable backlight regions each having multiple light-emitting units for emitting light in different colors, the LCD module has a plurality of display blocks, each of the display blocks corresponds to one of the backlight regions and is disposed on an optical path of light emitted from the light-emitting units of the corresponding backlight regions, the power regulating module comprising: a dividing unit for dividing the image frame data into plural image frame data blocks each according to one of the backlight regions and the respective display block; and a regulating unit electrically connected to the dividing unit, for adjusting a transmission rate of each of the pixels of each display block and the light-emitting intensity of the respective backlight region according to a ratio derived from the corresponding image frame data block, each display block has a plurality of pixels, each of the pixels has multiple filter units, a transmitted spectrum of each of the light-emitting units of the backlight regions corresponds to transmitted spectrums of at least two filter units of each of the pixels in the respective display blocks, the image control method comprising:
receiving image frame data to be displayed by the display blocks;
controlling light-emitting intensities of the backlight regions in accordance with the image frame data; and
allowing light emitted from each of the light-emitting units of the backlight regions to pass through said at least two filter units of each of the pixels in the respective display blocks.

8. The method according to claim 7, wherein
each of the backlight regions has a first light-emitting unit and a second light-emitting unit for emitting light in different colors;

each display block has a plurality of pixels, each of the pixels has a first filter unit, a second filter unit and an enhancing filter unit, a transmitted spectrum of the first filter unit corresponds to a light emitting spectrum of the first light-emitting unit, a transmitted spectrum of the second filter unit corresponds to a light emitting spectrum of the second light-emitting unit, and a transmitted spectrum of the enhancing filter unit corresponds to the light emitting spectrums of the first light-emitting unit and the second light- emitting unit;
said method further comprising:
emitting light from at least one of the first and second light-emitting units, through the respective first and second filter units as well as through the enhancing filter unit, to the respective display block.

9. The method according to claim 8, wherein each of the backlight regions of the backlight module further has a third light-emitting unit having a color different from that of each of the first light-emitting unit and the second light-emitting unit, each of the pixels of the display block has a third filter unit, a transmitted spectrum of the third filter unit corresponds to a light emitting spectrum of the third light-emitting unit, the transmitted spectrum of the enhancing filter unit corresponds to at least two of the light emitting spectrums of the first light-emitting unit, the second light-emitting unit and the third light-emitting unit,
said method further comprising:
emitting light from at least one of the first, second and third light-emitting units, through the respective first, second and third filter units as well as through the enhancing filter unit, to the respective display block.

10. The method according to claim 7, wherein the method further comprises:
dividing the image frame data into plural image frame data blocks each according to one of the backlight regions and the respective display block; and
adjusting a transmission rate of each of the pixels of each display block and the light-emitting intensity of the respective backlight region according to a ratio derived from the corresponding image frame data block.

11. The method according to claim 10, wherein the ratio is equal to a ratio of the highest pixel transmission rate in said image frame data block to a maximum pixel transmission rate.

12. The method according to claim 11, wherein said adjusting comprises raising the transmission rate of each of the pixels of the display block and reducing the light-emitting intensity of the respective backlight region according to said ratio.

13. The LCD apparatus according to claim 1, wherein
each of the backlight regions has a first light-emitting unit, a second light-emitting unit and a third light-emitting unit for emitting light in different colors; and
each of the pixels has a first filter unit, a second filter unit, a third filter unit and an enhancing filter unit, a transmitted spectrum of the first filter unit corresponds to light emitting spectrums of the second light-emitting unit and the third light-emitting unit, a transmitted spectrum of the second filter unit corresponds to light emitting spectrums of the first light-emitting unit and the third light-emitting unit, a transmitted spectrum of the third filter unit corresponds to light emitting spectrums of the first light-emitting unit and the second light-emitting unit, and a transmitted spectrum of the enhancing filter unit corresponds to the light emitting spectrums of the first light-emitting unit, the second light-emitting unit and the third light-emitting unit.

14. The method according to claim 7, wherein each of the backlight regions has a first light-emitting unit, a second light-emitting unit and a third light-emitting unit for emitting light in different colors, each of the pixels has a first filter unit, a second filter unit, a third filter unit and an enhancing filter unit, a transmitted spectrum of the first filter unit corresponds to light emitting spectrums of the second light-emitting unit and the third light-emitting unit, a transmitted spectrum of the second filter unit corresponds to light emitting spectrums of the first light-emitting unit and the third light-emitting unit, a transmitted spectrum of the third filter unit corresponds to light emitting spectrums of the first light-emitting unit and the second light-emitting unit, and a transmitted spectrum of the enhancing filter unit corresponds to the light emitting spectrums of the first light-emitting unit, the second light-emitting unit and the third light-emitting unit, the image control method further comprising emitting light to the respective display block from at least one of

- the first light-emitting unit through the second filter unit, the third filter unit and the enhancing filter unit of each of the pixels of the display block,
- the second light-emitting unit through the first filter unit, the third filter unit and the enhancing filter unit of each of the pixels of the display block, and
- the third light-emitting unit through the first filter unit, the second filter unit and the enhancing filter unit of each of the pixels of the display block.

15. The LCD apparatus according to claim 1, wherein

- each of the backlight regions has a first light-emitting unit, a second light-emitting unit and a third light-emitting unit for emitting light in different colors; and
- each of the pixels has a first filter unit, a second filter unit and a third filter unit, a transmitted spectrum of the first filter unit corresponds to light emitting spectrums of the second light-emitting unit and the third light-emitting unit, a transmitted spectrum of the second filter unit corresponds to light emitting spectrums of the first light-emitting unit and the third light-emitting unit, and a transmitted spectrum of the third filter unit corresponds to light emitting spectrums of the first light-emitting unit and the second light-emitting unit.

16. The LCD apparatus according to claim 15, further comprising an enhancing filter unit, wherein a transmitted spectrum of the enhancing filter unit corresponds to the light emitting spectrum of at least one of the first light-emitting unit, the second light-emitting unit and the third light-emitting unit.

17. The LCD apparatus according to claim 1, wherein the power regulating module is operable to control the light-emitting intensity of at least one of the light-emitting units of the backlight region in accordance with the image frame data to be displayed by the corresponding display block.

18. The method according to claim 7, wherein said controlling comprises adjusting the light-emitting intensity of at least one of the light-emitting units of the backlight region in accordance with the image frame data to be displayed by the corresponding display block.

19. The method according to claim 7, wherein

- each of the backlight regions has a first light-emitting unit, a second light-emitting unit and a third light-emitting unit for emitting light in different colors; and
- each of the pixels has a first filter unit, a second filter unit and a third filter unit, a transmitted spectrum of the first filter unit corresponds to light emitting spectrums of the second light-emitting unit and the third light-emitting unit, a transmitted spectrum of the second filter unit corresponds to light emitting spectrums of the first light-emitting unit and the third light-emitting unit, and a transmitted spectrum of the third filter unit corresponds to light emitting spectrums of the first light-emitting unit and the second light-emitting unit;
- the image control method further comprising emitting light to the respective display block from
- the first light-emitting unit through the second filter unit and the third filter unit of each of the pixels of the display block,
- the second light-emitting unit through the first filter unit and the third filter unit of each of the pixels of the display block, and
- the third light-emitting unit through the first filter unit and the second filter unit of each of the pixels of the display block.

* * * * *